United States Patent [19]
Morini

[11] 3,788,260
[45] Jan. 29, 1974

[54] SHOCK ABSORBER FOR USE AS A FENDER FOR SHIPS

[75] Inventor: Emilio Morini, Milan, Italy

[73] Assignee: Societa' Applicazioni Gomma Antivibranti "Saga" S.p.A., Milan, Italy

[22] Filed: Feb. 7, 1973

[21] Appl. No.: 330,347

[52] U.S. Cl. .............................................. 114/219
[51] Int. Cl. ............................................ B63b 59/02
[58] Field of Search. 114/219; 61/48; 293/1, DIG. 2

[56] References Cited
UNITED STATES PATENTS

| | | | |
|---|---|---|---|
| 3,564,858 | 2/1971 | Pogonowski | 114/219 X |
| 3,459,004 | 8/1959 | Morini | 114/219 X |
| 821,770 | 5/1906 | Truax | 61/48 |

FOREIGN PATENTS OR APPLICATIONS

| | | | |
|---|---|---|---|
| 636,643 | 2/1962 | Canada | 114/219 |

Primary Examiner—Trygve M. Blix
Assistant Examiner—Gregory W. O'Connor
Attorney, Agent, or Firm—Sughrue, Rothwell, Mion, Zinn and Macpeak

[57] ABSTRACT

A shock absorber arrangement for use as a fender for ships and comprising a fixed plate mountable on a harbour wall and a movable plate connected thereto by an array of resilient shock absorbers of known type. The array of shock absorbers are coupled in three pairs to three points of the fixed plate, the three points lying at the apices of an equilateral triangle, and each pair of shock absorbers forms an isosceles triangle the base of which is formed by the fixed plate; the angle of the vertex of the isosceles triangle is greater than the angle of the other two apices. The three vertices of the pairs of shock absorbers are coupled to points lying at the apices of an equilateral triangle on the movable plate; the two equilateral triangles are positioned angularly displayed from one another by 60° and the two plates lie in substantially parallel planes when the arrangement is in a rest position.

2 Claims, 4 Drawing Figures

SHOCK ABSORBER FOR USE AS A FENDER FOR SHIPS

BACKGROUND OF THE INVENTION

The present invention relates to resilient shock absorber arrangements for use on harbour wharves or jetties for use as fenders to absorb shocks caused by impacts of ships against the side thereof during docking maneuvres, and particularly to devices of the type which include at least one support plate attached to a side wall of the wharf or jetty, and a second plate, substantially parallel to the first, and connected movably to it by means of a plurality of resilient shock absorbers, which act to at least partly absorb impacts when the side of a ship strikes against the movable plate.

The shock absorbers are normally connected to the two plates by means of couplings which allow the freest possible movement so that the movable plate can move in almost any direction with respect to the plate which is fixed to the wall, and can also rotate for a limited amount about any axis.

In known shock absorber arrangements of this type the shock absorbers themselves are arranged in pairs, the axes of the two shock absorbers in each pair being inclined towards each other so that they converge either towards the wharf or towards the movable plate; the axes of the shock absorbers of each pair normally lie either in a vertical or a horizontal plane.

In practice it has been found that the movable plate is sometimes struck by a ship at its lower edge, close to the surface of the water, causing the bottom of the plate to incline towards the wharf; in this event it is possible for the different pairs of shock absorbers which support the plate to be moved beyond a dead centre position, thereby preventing return of the plate to the normal substantially vertical position after the impact due to a toggle action of the shock absorbers.

OBJECTS OF THE INVENTION

One object of the present invention is to provide a shock absorber arrangement in which the aforesaid disadvantage is eliminated, or at least the risk of this happening is substantially reduced so that the movable plate is able to move in any direction without it being possible to move the shock absorbers into a position where they could prevent the plate from returning to its normal vertical position, even in the event of an impact at the bottom edge of the plate.

Another object of the invention is to provide a device in which the behaviour of the shock absorbers can be wholly isotropic, that is independent of the direction of impact.

SUMMARY OF THE INVENTION

According to the present invention there is provided a resilient shock absorber arrangement suitable for the sides of jetties, wharves and the like, and operative to absorb at least part of an impact when struck by a ship during a docking maneuvre, of the type including a first plate attachable to a jetty, wharf or like fixed point, and a movable plate connected to the first plate by means of resilient shock absorbers, in which there are three pairs of such shock absorbers the axes of which form, with the sides of the first plate forming the bases thereof, three isosceles triangles which are connected at their vertices to the movable plate, the angles of the vertices being greater than the angles of the other two apices, the axes of the shock absorbers of the respective pairs lying in planes the intersections of which with the first plate form a substantially equilateral triangle one side of which is substantially horizontal and, the shock absorbers bein connected to the movable plate at points which form an equilateral triangle one side of which is substantially horizontal, the substantially horizontal side of one of the two equilateral triangles forming the upper side thereof and the substantially horizontal side of the other equilateral triangle forming the lower side thereof.

Further characteristics and advantages of the invention will become more apparent during the course of the following description with reference to the accompanying drawings, which is given purely by way of non-restrictive example.

DESCRIPTION OF THE PREFERRED EMBODIMENTS

Figure 1:
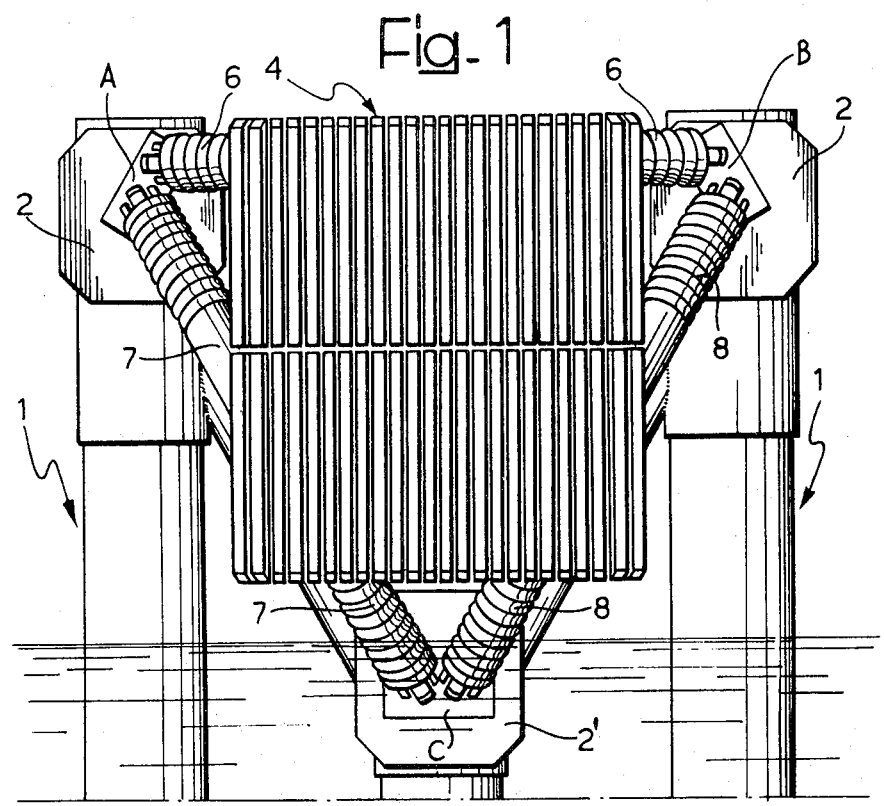
FIG. 1 is a front view of a resilient shock absorber device for absorbing the shocks of impacts of ships against the side of a wharf or jetty during docking maneuvres.
Figure 3:
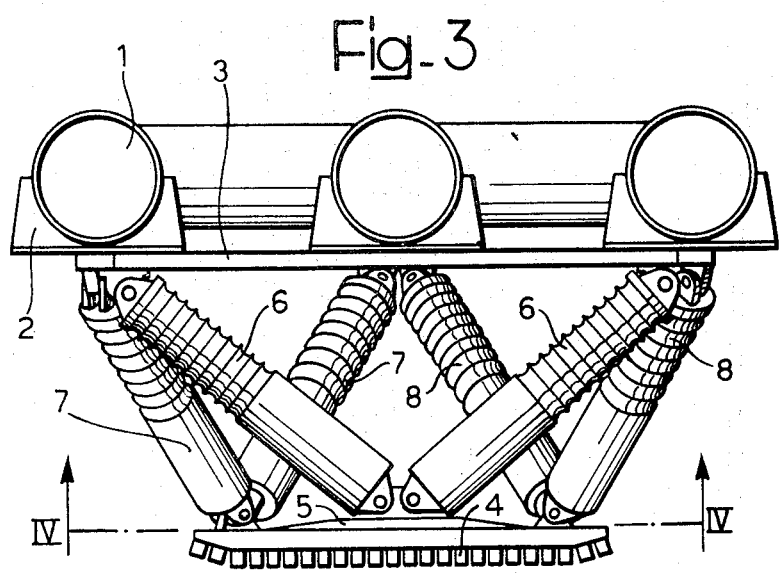
FIG. 3 is a plan view of the embodiment of FIG. 1.
Figure 2:
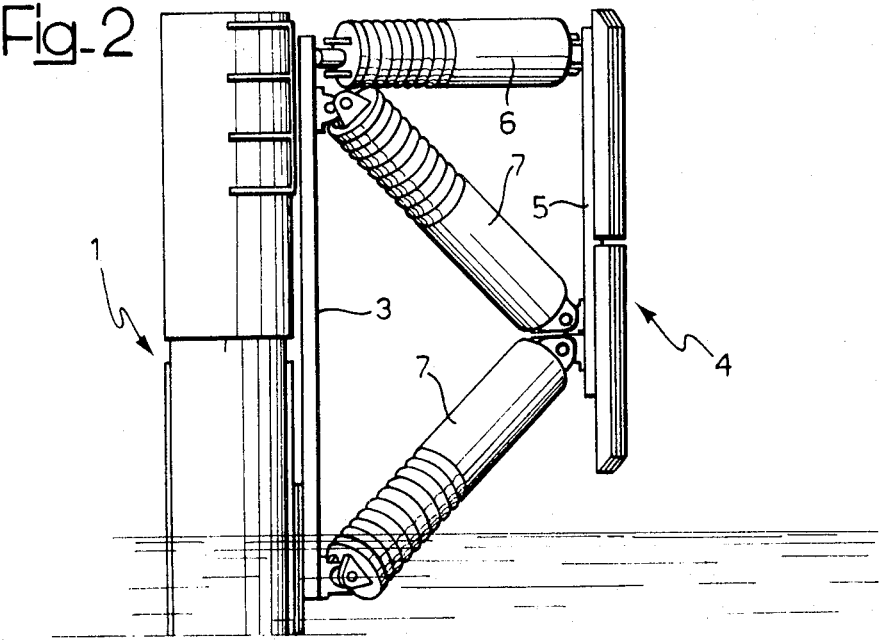
FIG. 2 is a side view of the embodiment of FIG. 1.
Figure 4:
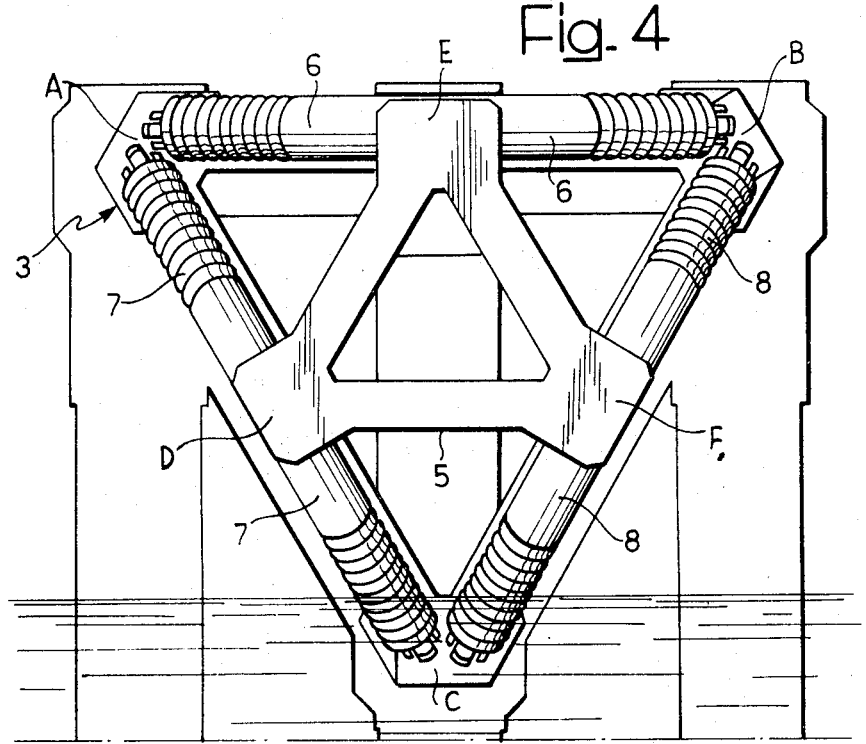
FIG. 4 is a longitudinal section of the embodiment of FIG. 1, taken on the line IV—IV of FIG. 3.

The resilient shock absorber arrangement shown in the drawings can be secured to the side of a wharf or, as illustrated in the drawings, may be mounted on a set of vertical posts 1 which are set in the bottom or bed of the stretch of water near the side of a wharf. On the posts there are mounted support plates 2, 2' to which is attached a triangular fixed coupling plate 3 the shape of which is substantially an equilateral triangle, the vertices A, B, C, of which are so arranged that the side A–B is substantially horizontal.

To the fixed coupling plate 3 there is attached a movable plate 4, having at the rear, that is the side facing the coupling plate 3, a triangular reinforcement plate 5, the vertices D, E, F of which form a substantially equilateral triangle one side DF of which is substantially horizontal. The reinforcement plate 5 is smaller than the fixed coupling plate 3 and is positioned with an apex E above the horizontal side DF and at the same horizontal level as the side AB of the fixed coupling plate 3 the other apex C of which lies below the horizontal side AB.

The movable plate 4 is attached to the fixed coupling plate 3 by means of three pairs of relatively long resilient transverse shock absorbers 6, 7, 8 of a type which are known per se, and which may comprise rubber springs alternated with metal discs. The shock absorbers 6 of the upper pair are positioned so that their axes form, with the fixed coupling plate 3, an isosceles triangle the angle of the vertex of which is greater than the angle of the other two apices. The vertex being formed at the ends which are coupled to the movable plate: in more detail, the ends of the shock absorbers 6 are attached respectively to the vertices A, B of the fixed coupling plate 3 and the shock absorbers 6 converge towards the movable plate 4 and are connected thereto at the upper apex E of the reinforcement plate. The shock absorbers 7 situated on one of the "sides" of the arrangement are attached respectively to the apices A and C of the fixed coupling plate 3, and they converge towards the movable plate 4 and are connected thereto at the apex D of the reinforcement plate 5. Similarly the shock absorbers 8 of the other "side" are respectively attached to the apices B and C of the fixed coupling plate 3 and they converge towards the movable plate at the apex F of the reinforcement plate 5.

Each of the ends of each shock absorber is attached by a double joint, or a ball and socket joint, to the two plates 3 and 5 in order to allow the greatest degree of freedom to the movable plate.

Each pair of shock absorbers 6, 7 and 8 is so positioned that their axes lie in planes which includes a respective side of the fixed coupling plate 3.

This arrangement allows the movable plate 4 to have great freedom of movement while ensuring that the shock absorbers are constrained to move in such a way that the movable plate is returned correctly to its normal rest position after an impact in any direction, and with the point of application localised at any point on the movable plate 4.

Thus, even when an impact is localised at the bottom edge of the movable plate 4, such that this is urged further towards the wharf than the remainder of the movable plate 4, the deflection of the relevant shock absorbers 7 and 8, is nevertheless such as to ensure the return of the plate 4 to its substantially vertical normal position when the distorting thrust is removed.

I claim:

1. A resilient shock absorber arrangement attachable to a harbour wall or like fixed point to absorb shocks generated by impacts of ships against the sides thereof during docking maneuvres, of the type comprising:

a first plate attachable to said fixed point, a second plate presenting an abutment surface for ships to strike against, resilient elongate shock absorber means interconnecting said first plate and said second plate, said shock absorber means being connected in three pairs such that the axes of the shock absorber means of each pair form an isosceles triangle, the base of which is formed by the said first plate and the vertex of which has a greater angle than the angle of the base apices, said three pairs of shock absorber means lying in three planes which define a first substantially equilateral triangle where they intersect the said first plate, one side of said first substantially equilateral triangle being substantially horizontal, the three vertices of said isosceles triangles formed by said three pairs of shock absorber means being connected to said second plate at three points defining a second substantially equilatral triangle one side of which is substantially horizontal, the substantially horizontal side of one of said first and second substantially equilateral triangles forming the upper side thereof, and the substantially horizontal side of said other of said first and second substantially equilateral triangles forming the lower side thereof.

2. The shock absorber arrangement of claim 1 wherein th ends of said shock absorber means forming said base apices of adjacent isosceles triangles are connected to said first plate at substantially coincident positions which also coincide with the positions of said apices of said first substantially equilateral triangle formed by the intersections of said planes in which lie said axes of said pairs of shock absorber means with the plane of said first plate.

* * * * *

UNITED STATES PATENT OFFICE
CERTIFICATE OF CORRECTION

Patent No. 3,788,260                 Dated January 29, 1974

Inventor(s) Emilio Morini

It is certified that error appears in the above-identified patent and that said Letters Patent are hereby corrected as shown below:

In The Heading:

The Priority Date Was Omitted. Should be.

--May 18, 1972     Italy...................... 24508-A/72

Signed and sealed this 2nd day of July 1974.

(SEAL)
Attest:

EDWARD M. FLETCHER, JR.          C. MARSHALL DANN
Attesting Officer                 Commissioner of Patents